(12) United States Patent
Schilling

(10) Patent No.: US 6,669,393 B2
(45) Date of Patent: Dec. 30, 2003

(54) CONNECTOR ASSEMBLY FOR GAS TURBINE ENGINES

(75) Inventor: Jan Christopher Schilling, Middletown, OH (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/974,194

(22) Filed: Oct. 10, 2001

(65) Prior Publication Data

US 2003/0068192 A1 Apr. 10, 2003

(51) Int. Cl.[7] .............................. F16D 9/10; B64D 27/10
(52) U.S. Cl. .............................. 403/2; 244/54; 60/797; 248/554
(58) Field of Search ................................ 403/2, 79, 11, 403/67, 156, 157, 150, 153, 162; 244/54, 55, 56; 74/606 R; 60/796, 797; 248/554

(56) References Cited

U.S. PATENT DOCUMENTS

| | | |
|---|---|---|
| 3,950,941 A | 4/1976 | Ohrn |
| 4,875,655 A | 10/1989 | Bender et al. |
| 5,122,007 A * | 6/1992 | Smith .............................. 403/2 |
| 5,174,502 A | 12/1992 | Lippmeier et al. |
| 5,193,787 A * | 3/1993 | Coopland, Jr. .......... 403/162 X |
| 5,275,357 A | 1/1994 | Seelen et al. |
| 5,277,382 A | 1/1994 | Seelen et al. |
| 5,303,880 A | 4/1994 | Cencula et al. |
| 5,307,623 A | 5/1994 | Antuna et al. |
| 5,320,307 A * | 6/1994 | Spofford et al. .............. 244/54 |
| 5,415,439 A | 5/1995 | Wells |
| 5,438,756 A | 8/1995 | Halchak et al. |
| 5,797,483 A | 8/1998 | Smith et al. |
| 5,921,500 A * | 7/1999 | Ellis et al. ..................... 244/54 |
| 5,927,644 A * | 7/1999 | Ellis et al. ..................... 244/54 |
| 6,212,974 B1 * | 4/2001 | Van Duyn ................... 244/54 |

* cited by examiner

Primary Examiner—Lynne H. Browne
Assistant Examiner—Ryan M. Flandro
(74) Attorney, Agent, or Firm—Armstrong Teasdale LLP; Robert B. Reeser, III

(57) ABSTRACT

A connector assembly for mounting turbomachinery including a link connector to be coupled to a clevis. The clevis includes a pair of arms and an opening that extends therethrough. The link connector includes a first end that includes an elastomer portion that defines an opening. The connector assembly further includes a support washer having an opening extending therethrough adjacent the link connector elastomer portion, and a fastener inserted through the clevis opening, the support washer opening, and the link connector elastomer opening to couple the link connector and the support washer to the clevis such that the link connector is coupled between the clevis arms by the fastener, and such that the support washer thermally insulates at least a portion of the link connector elastomer portion. At least a portion of the connector assembly being configured to shear when subjected to a predetermined load such that loading induced to the connector assembly is transmitted through the link connector elastomer portion.

15 Claims, 4 Drawing Sheets

CONNECTOR ASSEMBLY FOR GAS TURBINE ENGINES

BACKGROUND OF THE INVENTION

This application relates generally to coupling assemblies and, more particularly, to methods and apparatus for coupling a link connector to a clevis.

Coupling assemblies that includes a link connector coupled to a clevis are used to support secondary structures. For example, in at least some known turbine engines, such coupling assemblies are used to support secondary structures, such as geardrive trains, to turbomachinery. The link connectors provide the prime support for the secondary structure and also isolate the structures from vibrations generated by the turbomachinery. More specifically, the link connectors include a elastomer support end that includes an opening that extends therethrough.

The link connectors also provide alignment of the secondary structure with respect to the turbomachinery. Maintaining proper alignment between the secondary structure and the turbomachinery facilitates preventing gear and/or bearing damage within the geardrive trains. Furthermore, the elastomers provide support for ultimate loading conditions, such as blade out conditions.

However, exposure to environmental elements, such as high temperatures which may be generated by the turbomachinery or caustic fluids which may be present, may cause the elastomers to degrade. Over time, continued degradation may cause the elastomer portion of the link connectors to sag or loosen, and as such, may cause the alignment of the secondary structure with respect to the turbomachinery to shift. Such misalignment may cause bearing and/or gear damage.

BRIEF DESCRIPTION OF THE INVENTION

In one aspect of the invention, a connector assembly is provided. The connector assembly includes a link connector, a clevis, a fastener, and a support washer. The link connector includes a first end that includes an elastomer portion that defines an opening extending therethrough. The clevis includes a first arm, a second arm, and an opening extending therethrough. The fastener is configured to extend through the clevis opening and the link connector elastomer opening to couple the link connector to the clevis such that the link connector is between the clevis arms. The support washer includes an opening that extends therethrough and the washer extends circumferentially around the fastener between the link connector and at least one of the clevis arms.

In another aspect, a method for coupling a link connector to a clevis is provided. The clevis includes a pair of arms and an opening that extends therethrough. The link connector includes a first end that includes an elastomer portion that defines an opening. The method includes positioning a support washer including an opening extending therethrough adjacent the link connector elastomer portion, and inserting a fastener through the clevis opening, the support washer opening, and the link connector elastomer opening to couple the link connector and the support washer to the clevis such that the link connector is coupled between the clevis arms by the fastener, and such that the support washer thermally insulates at least a portion of the link connector elastomer portion.

In a further aspect, a connector assembly for a gas turbine engine is provided. The connector assembly includes a link connector, a U-shaped clevis, a support washer, and a fastener. The link connector includes a first end that includes an elastomer portion that defines an opening extending therethrough. The elastomer portion is configured to damp vibrations induced within the link connector. The clevis includes a first arm, a second arm, and an opening that extends therethrough. The support washer also includes an opening extending therethrough. The fastener is configured to extend through the clevis opening, the support washer opening, and the link connector elastomer opening to couple the link connector and the support washer to the clevis, such that the link connector is coupled between the clevis arms by the fastener. The support washer is configured to thermally insulate the link connector elastomer portion.

DETAILED DESCRIPTION OF THE INVENTION

Figure 1:
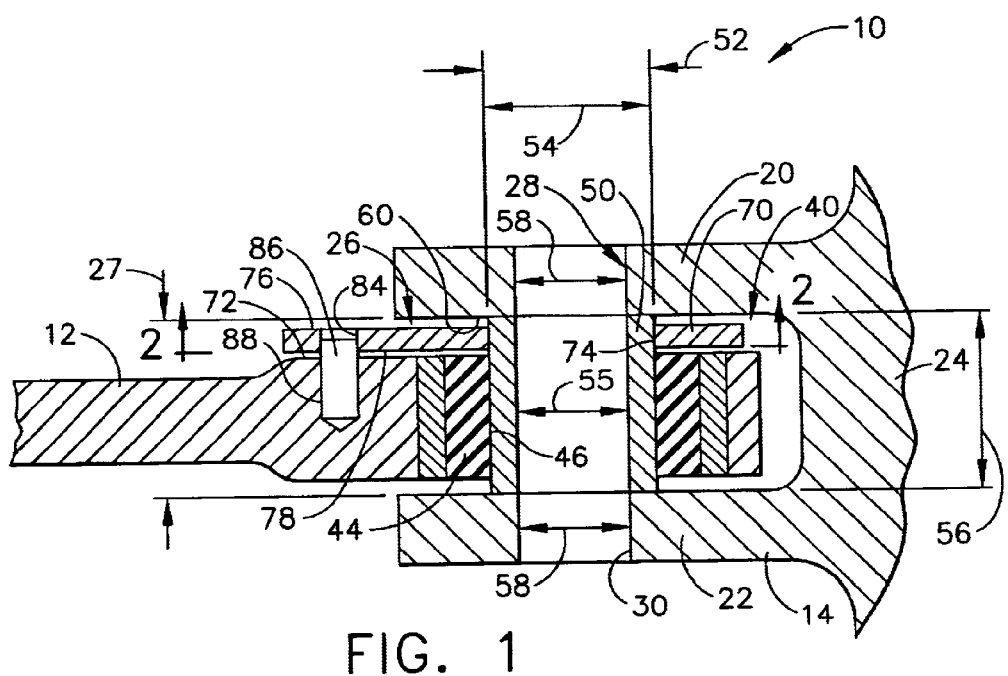
FIG. 1 is a cross-sectional view of a coupling assembly including a link connector and a clevis.
Figure 2:
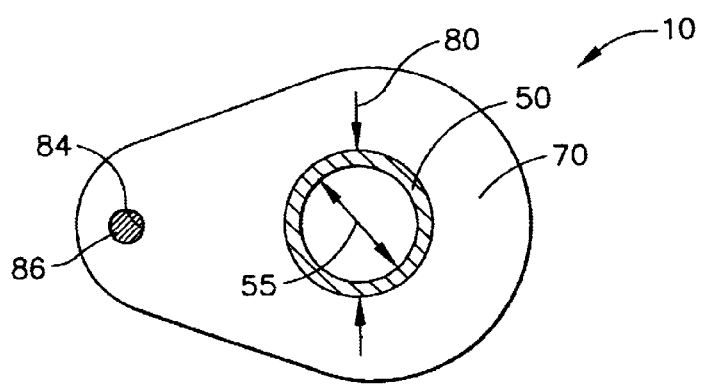
FIG. 2 is a cross-section of the coupling assembly shown in FIG. 1 taken along line 2—2.

FIG. 1 is a cross-sectional view of a coupling assembly 10 including a link connector 12 and a clevis 14. FIG. 2 is a cross-section of coupling assembly 10 taken along line 2—2 (shown in FIG. 1). Clevis 14 is known and is substantially U-shaped and includes a first arm 20 and a second arm 22 that extend from a body 24. Arms 20 and 22 define a cavity 26 therebetween that is sized to receive link connector 12 therein. More specifically, cavity 26 has a width 27 measured between arms 20 and 22.

Each clevis arm 20 and 22 includes a respective opening 28 and 30 extending therethrough. Openings 28 and 30 are identical and are concentrically aligned. Openings 28 and 30 are sized to receive a fastener (not shown in FIGS. 1 and 2) therethrough for coupling link connector 12 to clevis 14.

Link connector 12 includes a first end 40 and a second end (not shown) and is used to support and align a secondary structure. In the exemplary embodiment, link connector 12 is used to support a geartrain (not shown) within a turbofan engine (not shown), and to provide alignment of a gearbox with respect to the turbomachinery. Link connector first end 40 includes an elastomer portion 44 that defines an opening 46 that extends therethrough. Elastomer portion 44 facilitates damping vibrations induced through clevis 14. In the exemplary embodiment, elastomer portion 44 facilitates isolating the geardrive trains from vibrations generated by the turbomachinery. Opening 46 is sized to receive the fastener and a mounting sleeve 50 therethrough. In the exemplary embodiment, mounting sleeve 50 is bonded to elastomer portion 44 through opening 46.

Mounting sleeve 50 extends through elastomer portion opening 46 and has an outer diameter 52 that is slightly smaller than a diameter 54 of opening 46. Mounting sleeve 50 also has an inner diameter 55 and a height 56. Inner diameter 55 is approximately equal a diameter 58 of clevis openings 28 and 30, and mounting sleeve height 56 is slightly less than clevis cavity width 27. Accordingly, when mounting sleeve 50 is extended through elastomer portion opening 46 and link connector 12 is inserted within clevis cavity 26, mounting sleeve 50 contacts an inner surface 60 of clevis cavity 26 circumferentially around each opening 28 and 30.

A support washer 70 is positioned adjacent an outer surface 72 of link connector first end 40. More specifically, washer 70 is coupled to link connector 12 such that when link connector 12 is coupled to clevis 14, support washer 70 is between clevis 14 and link connector 12. Support washer 70 includes a fastener opening 74 that extends between an upper surface 76 of support washer 70 and a lower surface 78 of support washer 70. Opening 74 has a diameter 80 that is approximately equal to elastomer portion opening diameter. Accordingly, support washer 70 is sized to receive mounting sleeve 50 therethrough. In the exemplary embodiment, washer opening 74 is substantially circular. In an alternative embodiment, opening 74 is non-circular to facilitate accommodating elastomer degradation.

In the exemplary embodiment, support washer 70 has a substantially tear-shaped cross-sectional profile. The tear-shaped cross-sectional profile enables washer 70 to extend substantially across elastomer portion 44 when coupled to link connector 12, and thus, as described in more detail below, enables washer 70 to thermal insulate elastomer portion 44. Alternatively, support washer 70 may have a non-tear-shaped cross-sectional profile.

Support washer 70 also includes a shear pin opening 84 that is sized to receive a shear pin 86 therethrough. Shear pin 86 couples support washer 70 to link connector 12 and extends at least partially into a shear pin opening 88 defined within link connector 12.

During assembly, support washer 70 is coupled to link connector 12 by shear pin 86, such that support washer lower surface 78 contacts link connector outer surface 72. Furthermore, when coupled to link connector 12, support washer openings 74 and 84 are substantially concentrically aligned with respect to respective link connector openings 46 and 88.

Link connector 12 is then inserted between clevis arms 20 and 22 into cavity 26. When openings 74 and 46 are substantially concentrically aligned by sleeve 50 and with respect to clevis openings 28 and 30, the fastener is inserted through clevis 14, sleeve 50, and link connector 12 to couple link connector 12 to clevis 14.

During use, link connector 12 facilitates aligning a secondary structure. Over time, although support washer 70 thermally insulates elastomer portion 44, elastomer portion 44 may still degrade as a result of exposure to heat, caustic fluids, or environmental exposure. When degradation occurs, support washer 70 provides structural support to link connector 12 and facilitates preventing portion 44 from failing due to sagging. In an alternative embodiment, support washer 70 is not used a primary load path, and rather opening 74 is elongated to accommodate elastomer degradation.

During normal operations, loading is transmitted through link connector 12 to clevis 14 via support washer 70. However, during abnormal or extreme loading, such as may occur in a turbine engine following a blade out condition, pin 86 shears and the loading is transmitted through elastomer portion 44, thus facilitating preventing damage to the secondary structure. In one embodiment, pin 86 shears when a pre-determined loading is applied to link connector 12.

Figure 3:
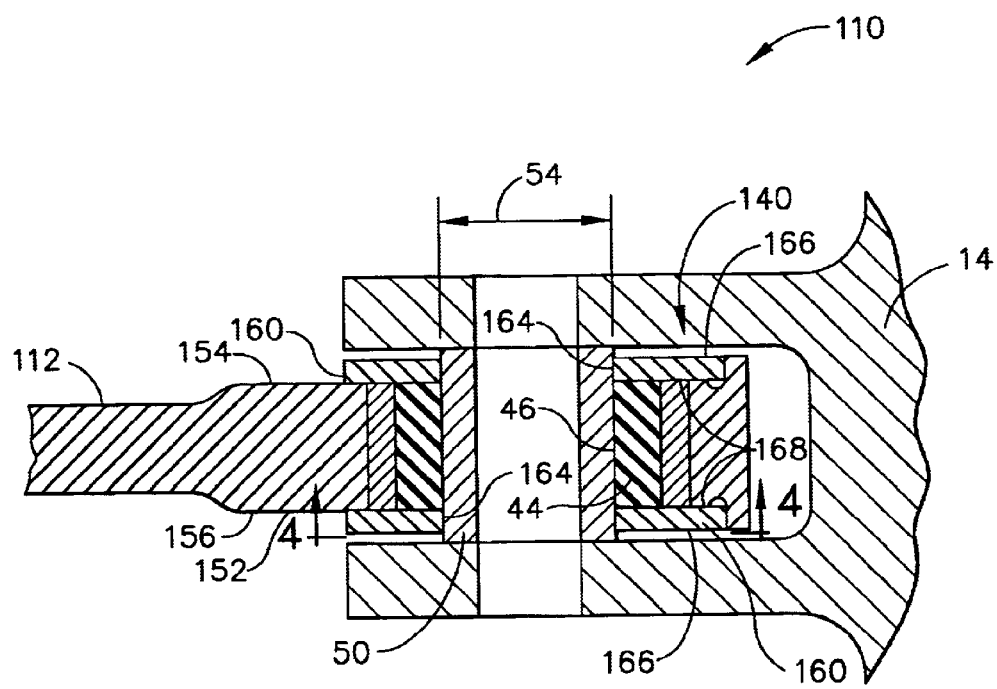
FIG. 3 is a cross-sectional view of an alternative embodiment of a coupling assembly including a link connector and a clevis.
Figure 4:
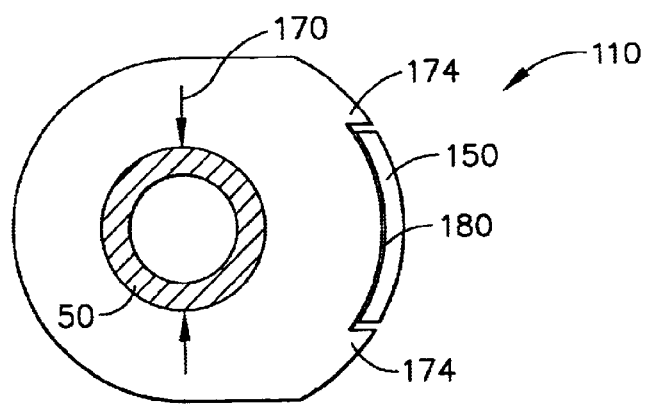
FIG. 4 is a cross-sectional view of the coupling assembly shown in FIG. 3 taken along line 4—4.

FIG. 3 is a cross-sectional view of an alternative embodiment of a coupling assembly 110. FIG. 4 is a cross-sectional view of coupling assembly 110 taken along line 4—4 (shown in FIG. 3). Coupling assembly 110 is substantially similar to coupling assembly 10 shown in FIGS. 1 and 2, and components in coupling assembly 110 that are identical to components of coupling assembly 10 are identified in FIGS. 3 and 4 using the same reference numerals used in FIGS. 2 and 3. Accordingly, coupling assembly 110 includes clevis 14, mounting sleeve 50, and a link connector 112 that is substantially similar link connector 10 (shown in FIGS. 1 and 2).

Link connector 112 includes a first end 140 and a second end (not shown) and is used to support and align a secondary structure. In the exemplary embodiment, link connector 112 is used to support a geartrain (not shown) within a turbofan engine (not shown), and to provide alignment of a gearbox with respect to the turbomachinery. Link connector first end 140 includes elastomer portion 44, opening 46, and a shear lip 150 that extends radially outward from an outer surface 152 of each side 154 and 156 of link connector 112.

A pair of identical support washers 160 are positioned adjacent each side 154 and 156 of link connector 112. More specifically, washers 160 are coupled to link connector 112, such that when link connector 112 is coupled to clevis 14, each support washer 160 is between clevis 14 and link connector 112. Each support washer 160 includes an opening 164 that extends between an outer surface 166 of each support washer 160 and an inner surface 168 of each support washer 160. Each opening 164 has a diameter 170 that is approximately equal to elastomer portion opening diameter 54. Accordingly, support washers 160 are sized to receive mounting sleeve 50 and a fastener (not shown in FIGS. 3 and 4) therethrough. In the exemplary embodiment, each washer opening 164 is substantially circular. In an alternative embodiment, each opening 164 is non-circular to facilitate accommodating elastomer degradation.

Each washer 160 also includes a pair of anti-rotation projections 174 that extend outwardly from washer 160. Projections 174 engage link connector shear lip 150 to facilitate preventing washers 160 from rotating independently of link connector 112.

During assembly, support washers 160 are positioned adjacent link connector sides 154 and 156, such that support washer inner surface 168 contacts link connector outer surface 152, and such that washer openings 164 are substantially concentrically aligned with respect to respective link connector openings 46.

Link connector 112 is then inserted between clevis arms 20 and 22 into cavity 26. When openings 164 and 46 are substantially concentrically aligned by mounting sleeve 50 and with respect to clevis openings 28 and 30, the fastener is inserted through clevis 14, washer 160, and link connector 112 to couple link connector 112 to clevis 14.

During use, link connector 112 facilitates aligning a secondary structure. Over time, although support washers 160 thermally insulate elastomer portion 44, elastomer portion 44 may still degrade as a result of exposure to heat, caustic fluids, or environmental exposure. When degradation occurs, support washers 160 provide structural support to link connector 12 and facilitate preventing portion 44 from failing due to sagging. In an alternative embodiment, each support washer 160 is not used a primary load path, and rather each washer opening 164 is elongated to accommodate elastomer degradation. Furthermore, in the exemplary embodiment, a gap 180 is defined between shear lip 150 and each support washer 160. Gap 180 also accommodates elastomer degradation.

During normal operations, loading is transmitted through link connector 112 to clevis 14 via support washers 160. However, during abnormal or extreme loading, such as may occur in a turbine engine following a blade out condition, shear lip 150 shears and the loading is transmitted through elastomer portion 44. In one embodiment shear lip 150 supports link connector 12 after elastomer degradation of elastomer portion 44.

Figure 5:
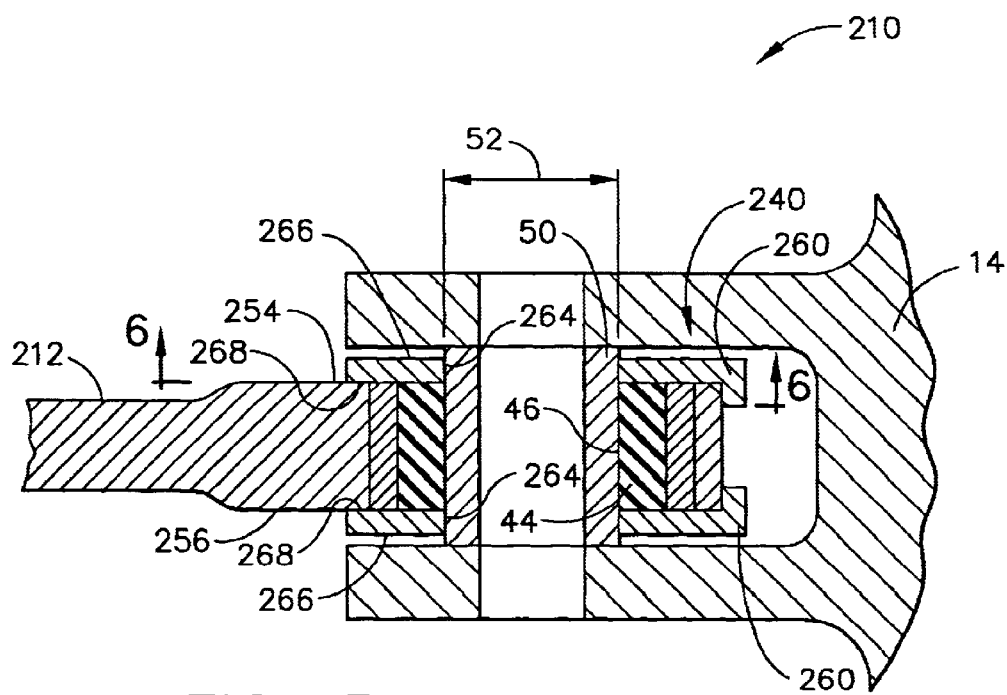
FIG. 5 is a cross-sectional view of a further alternative embodiment of a coupling assembly including a link connector and a clevis.
Figure 6:
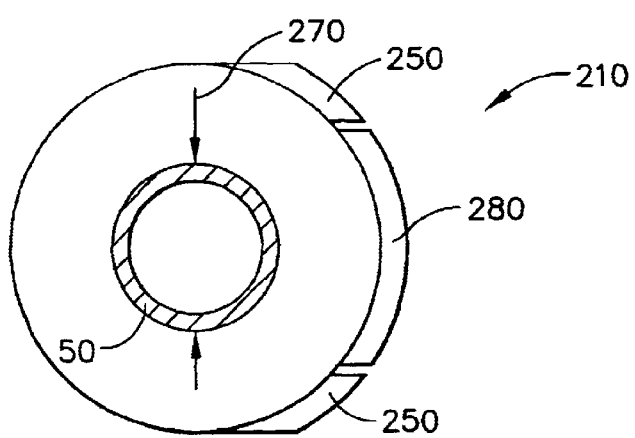
FIG. 6 is a cross-sectional view of the coupling assembly shown in FIG. 5 taken along line 6—6.

FIG. 5 is a cross-sectional view of a further alternative embodiment of a coupling assembly 210. FIG. 6 is a cross-sectional view of coupling assembly 210 taken along line 6—6. Coupling assembly 210 is substantially similar to coupling assembly 110 shown in FIGS. 3 and 4, and components in coupling assembly 210 that are identical to components of coupling assembly 110 are identified in FIGS. 4 and 5 using the same reference numerals used in FIGS. 4 and 5. Accordingly, coupling assembly 210 includes clevis 14, mounting sleeve 50, and a link connector 212 that is substantially similar link connector 110 (shown in FIGS. 3 and 4).

Link connector 212 includes a first end 240 and a second end (not shown) and is used to support and align a secondary structure. In the exemplary embodiment, link connector 212 is used to support a geartrain (not shown) within a turbofan engine (not shown), and to provide alignment of a gearbox with respect to the turbomachinery. Link connector first end 240 includes elastomer portion 44 and opening 46. Link connector first end 240 also includes a pair of anti-rotation projections 250 that extend outwardly from link connector first end 240.

A pair of identical support washers 260 are positioned adjacent each side 254 and 256 of link connector 212. More specifically, washers 260 are coupled to link connector 212 such that when link connector 212 is coupled to clevis 14, each support washer 260 is between clevis 14 and link connector 212. Each support washer 260 includes an opening 264 that extends between an outer surface 266 of each support washer 260 and an inner surface 268 of each support washer 260. Each opening 264 has a diameter 270 that is approximately equal to elastomer portion opening diameter 52. Accordingly, support washers 260 are sized to receive a fastener (not shown in FIGS. 5 and 6) therethrough. In the exemplary embodiment, each washer opening 264 is substantially circular. In an alternative embodiment, each opening 264 is non-circular to facilitate accommodating elastomer degradation.

Each washer 260 also includes a shear lip 280 that extends radially outward from each washer 260. Link connector anti-rotation projections 250 engage washer shear lips 280 to facilitate preventing washers 260 from rotating independently of link connector 212.

During assembly, support washers 260 are positioned adjacent link connector sides 254 and 256, such that support washer inner surface 268 contacts link connector outer surface 252, and such that washer openings 264 are substantially concentrically aligned by mounting sleeve 50 and with respect to respective link connector openings 46.

Link connector 212 is then inserted between clevis arms 20 and 22 into cavity 26. When openings 264 and 46 are substantially concentrically aligned with respect to clevis openings 28 and 30, the fastener is inserted through clevis 14, mounting sleeve 50, and link connector 212 to couple link connector 212 to clevis 14.

During use, link connector 212 facilitates aligning a secondary structure. Over time, although support washers 260 thermally insulate elastomer portion 44, elastomer portion 44 may still degrade as a result of exposure to heat, caustic fluids, or environmental exposure. When degradation occurs, support washers 260 provide structural support to link connector 12 and facilitate preventing portion 44 from failing due to sagging. In an alternative embodiment, support washers 260 are not used a primary load path, and rather openings 264 are elongated to accommodate elastomer degradation.

During normal operations, loading is transmitted through link connector 212 to clevis 14 via support washers 260. However, during abnormal or extreme loading, such as may occur in a turbine engine following a blade out condition, shear lip 280 shears when subjected to a pre-determined amount of loading, and the loading is transmitted through elastomer portion 44.

Figure 7:
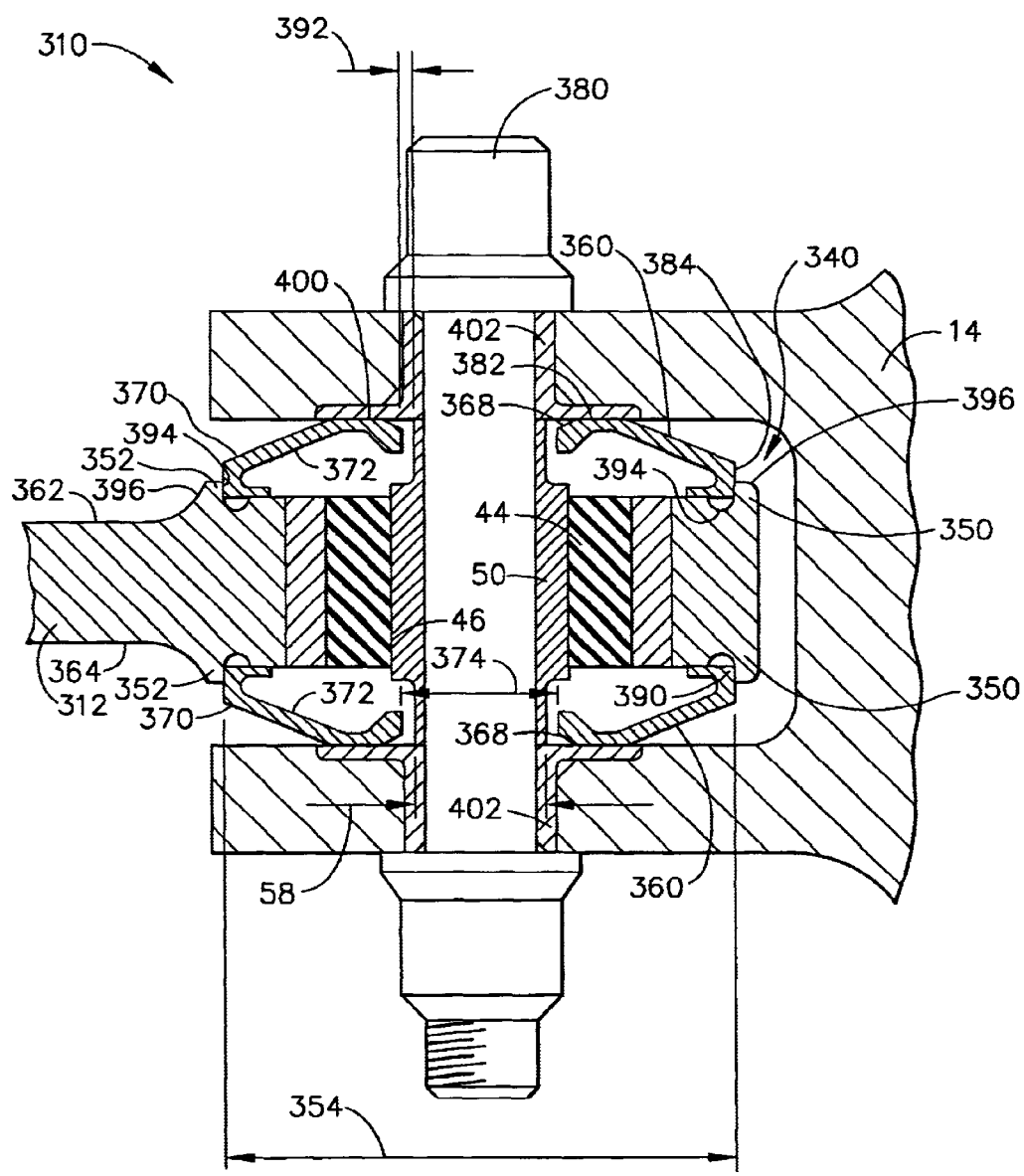
FIG. 7 is a cross-sectional view of another alternative embodiment of a coupling assembly including a link connector and a clevis.

FIG. 7 is a cross-sectional view of another alternative embodiment of a coupling assembly 310. Coupling assembly 310 is substantially similar to coupling assembly 10 shown in FIGS. 1 and 2, and components in coupling assembly 310 that are identical to components of coupling assembly 10 are identified in FIG. 7 using the same reference numerals used in FIGS. 1 and 2. Accordingly, coupling assembly 10 includes clevis 14, mounting sleeve 50, and a link connector 312 that is substantially similar link connector 112 (shown in FIGS. 3 and 4).

Link connector 312 includes a first end 340 and a second end (not shown) and is used to support and align a secondary structure. In the exemplary embodiment, link connector 312 is used to support a geartrain (not shown) within a turbofan engine (not shown), and to provide alignment of a gearbox with respect to the turbomachinery. Link connector first end 340 includes elastomer portion 44 and opening 46. Link connector first end 340 also includes a first pair of projections 350 that extend outwardly from link connector first end 340 and a second pair of projections 352 that extend outwardly from link connector 312 a distance 354 from first end 340.

A pair of identical annular support washers 360 are positioned adjacent each side 362 and 364 of link connector 312. More specifically, washers 360 are coupled to link connector 312 such that when link connector 312 is coupled to clevis 14, each support washer 360 is between clevis 14 and link connector 312. Each support washer 360 includes an opening 368 that extends between an outer surface 370 of each support washer 360 and an inner surface 372 of each support washer 360. Each opening 368 has a diameter 374 that is larger than clevis opening diameter 58. Accordingly, support washers 360 are sized to receive a fastener 380 therethrough. In the exemplary embodiment, each washer opening 368 is substantially circular, and fastener 380 is a combination threaded bolt and nut.

Each washer 360 has a frusto-conical cross-sectional profile extending between an inner edge 382 and an outer edge 384 of each washer 360. More specifically, each washer 360 is biased to remain in a frusto-conical configuration and is formed with a spring-like induced bias. Furthermore, washer edge 384 is formed with a shear lip 390 that enables each washer 360 to be biased against link connector projections 350 and 352, such that each washer is positioned a distance 392 from contacting mounting sleeve 50. More specifically, distance 392 is pre-selected to ensure a predetermined amount of nominal loading is induced through washers 360. Furthermore, each projection 350 and 352 includes a radially inner surface 394 and a radially outer surface 396, and each washer 360 is biased against each respective projection radially inner surface 394. In an alternative embodiment, washer edges 384 are biased against each respective projection radially outer surface 396.

Washer edge 382 includes an elbow 400 that enables each washer 360 to be in slidable contact against each respective clevis arm 20 and 22. More specifically, each elbow 400 is in slidable contact with a respective annular wear insert 402 inserted within each clevis opening 28 and 30. Wear inserts 402 facilitate preventing wear to clevis 14 during movement of washers 360.

During assembly, support washers 360 are positioned adjacent link connector sides 362 and 364, such that washer openings 368 are substantially concentrically aligned with respect to respective link connector openings 46. Link connector 312 is then inserted between clevis arms 20 and 22 into cavity 26. Fastener 380 is then inserted through clevis 14, washer 360, and link connector 312 to couple link connector 312 to clevis 14.

During use, link connector 312 provides alignment of the secondary structure. Over time, although support washers 360 thermally insulate elastomer portion 44, elastomer portion 44 may still degrade as a result of exposure to heat, caustic fluids, or environmental exposure. When degradation occurs, support washers 360 provide structural support to elastomer portion 44 and facilitate preventing portion 44 from failing due to sagging.

Furthermore, during normal operations, loading is transmitted through link connector 312 to clevis 14 via support washers 360. Because distance 392 enables a predetermined loading to be induced to washers 360, during normal operation, load is transferred through link connector 312 and through elastomer portion 44 to sleeve 50, fastener 380, and to clevis 14. During transient operations, or degraded conditions, washers 360 may translate towards and from mounting sleeve 50 to transmit loading through link connector 312 to clevis 14 via support washers 360. Wear inserts 402 facilitate preventing frictional contact and wear between washers 360 and clevis 14. However, during abnormal or extreme loading, such as may occur in a turbine engine following a blade out condition, washer edge lip 390 is configured to shear such that the loading is transmitted through a softer support elastomer portion 44.

The above-described coupling assemblies include a clevis, a link connector, a support washer, and a fastener that couples the link connector and the support washer to the clevis. The support washer thermally insulates the elastomer portion of the link connector and provides structural support between the link connector and the clevis if the elastomer portion degrades. Furthermore, the coupling assembly includes a shear section that facilitates the coupling assembly accommodating abnormal or ultimate loading. As a result, the support washer facilitates extending a useful life of the secondary support structure coupled to the clevis through the link connector.

While the invention has been described in terms of various specific embodiments, those skilled in the art will recognize that the invention can be practiced with modification within the spirit and scope of the claims.

What is claimed is:

1. A connector assembly, said connector assembly comprising:

a link connector comprising a first end comprising an elastomer portion and an opening extending therethrough, said opening defined by said elastomer portion;

a clevis comprising a first arm, a second arm, and an opening extending therethrough;

a fastener configured to extend through said clevis opening and said link connector elastomer opening to couple said link connector to said clevis such that said link connector is between said clevis arms; and a support washer comprising an opening extending therethrough, said washer extending circumferentially around said fastener between said link connector and at least one of said clevis arms; at least a portion of said connector assembly configured to shear when subjected to a predetermined load such that loading induced to said connector assembly is transmitted through said elastomer portion.

2. A connector assembly in accordance with claim 1 further comprising a pin configured to couple said support washer to said link connector, said pin configured to shear such that loading is transmitted through said link connector elastomer portion.

3. A connector assembly in accordance with claim 1 wherein said support washer opening is substantially circular.

4. A connector assembly in accordance with claim 1 wherein said support washer opening is non-circular.

5. A connector assembly in accordance with claim 1 wherein at least one of said support washer and said link connector first end further comprises a lip extension configured to shear such that loading is transmitted through said link connector elastomer portion.

6. A connector assembly in accordance with claim 1 wherein at least one of said support washer and said link connector first end further comprises an anti-rotation projection configured to prevent rotation of said support washer relative to said link connector.

7. A connector assembly in accordance with claim 1 wherein said support washer further comprises a shear portion configured to provide support to said link connector first end.

8. A connector assembly in accordance with claim 1 wherein said support washer configured to thermally insulate said link connector elastomer portion.

9. A connector assembly for a gas turbine engine, said connector assembly comprising:

a link connector comprising a first end comprising an elastomer portion defining an opening extending therethrough, said elastomer portion configured to damp vibrations induced within said link connector;

a u-shaped clevis comprising a first arm, a second arm, and an opening extending therethrough;

a support washer comprising an opening extending therethrough; and a fastener configured to extend through said clevis opening, said support washer opening, and said link connector elastomer opening to couple said link connector and said support washer to said clevis such that said link connector is coupled between said clevis arms by said fastener, said support washer configured to thermally insulate said link connector elastomer portion, at least a portion of said connector assembly configured to shear when subjected to a predetermined load such that loading induced to said connector assembly is transmitted through said link connector elastomer portion.

10. A connector assembly in accordance with claim 9 further comprising a mounting sleeve extending between said clevis arms through said link connector elastomer opening and said support washer opening.

11. A connector assembly in accordance with claim 10 wherein said support washer opening is non-circular.

12. A connector assembly in accordance with claim 10 wheren at least one of said support washer and said link connector comprises a lip configured to shear when a pre-determined amount of loading is induced to said link connector first end.

13. A connector assembly in accordance with claim 10 wherein at least one of said support washer and said link connector first end further comprises an anti-rotation projection configured to prevent rotation of said support washer relative to said link connector.

14. A link connector in accordance with claim 10 further comprising a pin extending through said support washer into said link connector, said pin configured to shear when a pre-determined amount of loading is induced to said link connector first end.

15. A link connector in accordance with claim 10 wherein said support washer further comprises shear portion configured to provide support to said link connector first end.

* * * * *